Jan. 7, 1941.  C. G. OLSON  2,227,464
FASTENER UNIT AND METHOD OF PRODUCING IT
Filed Nov. 2, 1938
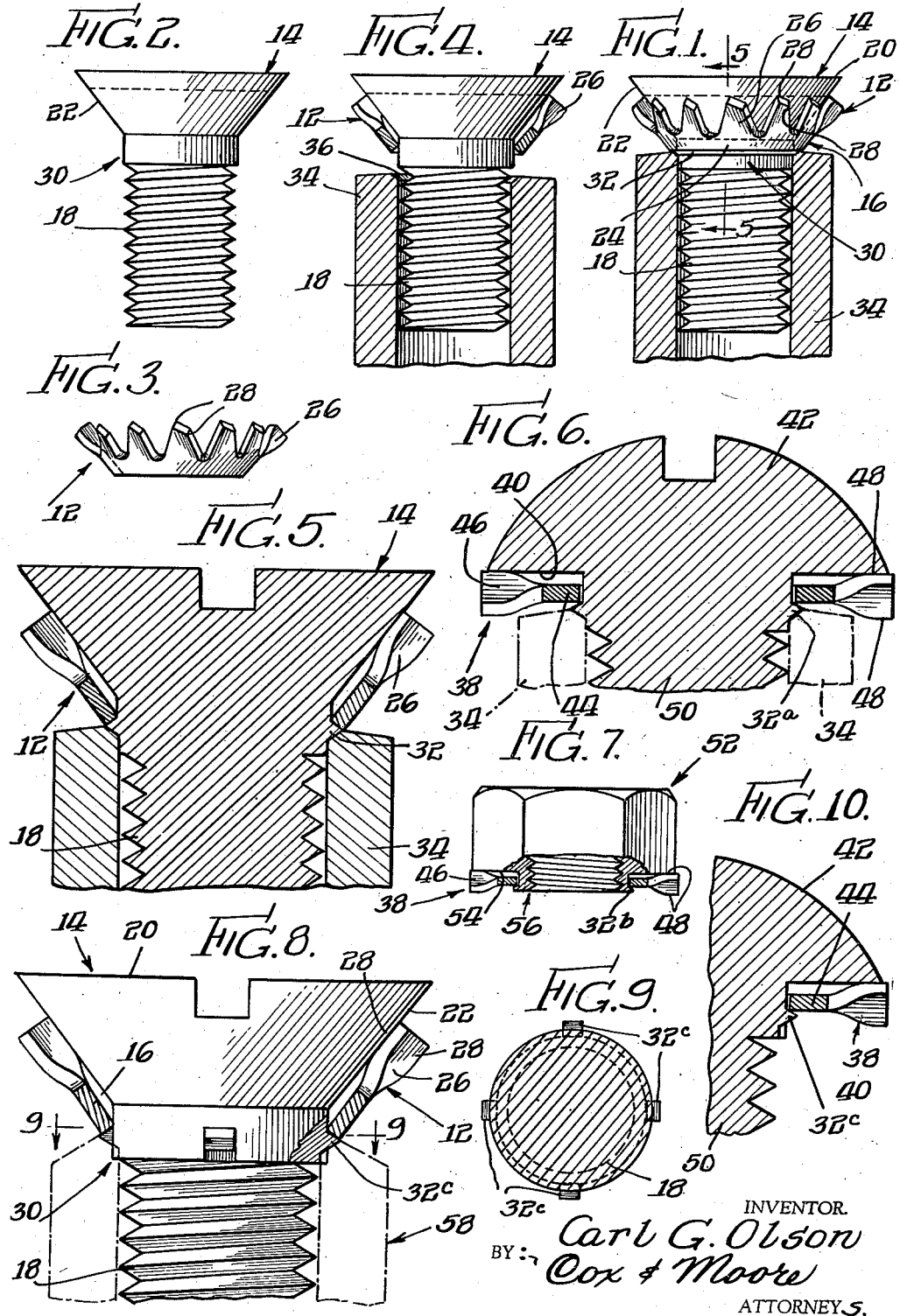

Patented Jan. 7, 1941

2,227,464

UNITED STATES PATENT OFFICE 2,227,464

FASTENER UNIT AND METHOD OF PRODUCING IT

Carl G. Olson, Chicago, Ill., assignor to Illinois Tool Works, Chicago, Ill., a corporation of Illinois Application November 2, 1938, Serial No. 238,418

7 Claims. (Cl. 10—2)

This invention relates to fastener units and methods of producing them, and more particularly to fastener units of the type wherein a lock washer is secured in preassembled relation with the clamping surface of a threaded fastener such as a screw head or nut.

My invention contemplates fastener units, as specified above, having improved lock washer retaining means formed in the vicinity of the clamping surface of a threaded fastener, such as a screw head or nut, which lock washer retaining means may be very expeditiously and economically produced.

More specifically, the invention contemplates preassembled threaded fasteners and lock washers wherein a peripheral lock washer retaining section is provided by a simple upsetting operation after the lock washer has been placed in operative association with the clamping surface of the fastener.

Still more specifically, it is an object of the present invention to provide the above mentioned improved fastener unit and methods of forming such units, wherein a section of a screw or nut in the vicinity of the clamping surface may be shifted radially outward by the application of force in a direction axially of the fastener, whereby to provide a peripheral shoulder for the retention of a lock washer in proper preassembled relation with respect to the clamping surface of the threaded fastener.

The foregoing and numerous other objects and advantages will be more apparent from the following detail description when considered in connection with the accompanying drawing, wherein—

Figure 1 discloses a fastener unit of the type contemplated hereby, wherein a lock washer is retained in proper preassembled relation with respect to the conical clamping surface of a flat type screw head through the agency of a peripheral protuberance formed by methods contemplated herein;

Figure 2 discloses the screw member of Figure 1 prior to the association therewith of a complementary conical lock washer;

Figure 3 discloses a conical or countersunk lock washer prior to its assembly with the screw of Figure 2;

Figure 4 discloses the lock washer of Figure 3 preliminarily associated with the screw of Figure 2 just prior to the upsetting of the screw stock by the tool also shown in section in Figure 4;

Figure 5 is an enlarged cross-sectional view of the fastener unit and tool, as shown in Figure 1, said view being taken substantially along the line 5—5 of Figure 1;

Figure 6 discloses the manner in which the present invention is applied in the assembly of flat type lock washers with the complementary flat clamping surface of a conventional screw head;

Figure 7 discloses a nut having a lock washer preassembled therewith in accordance with the teachings of the present invention;

Figure 8 is a view similar to Figure 5 disclosing the manner in which the lock washer may be retained in proper preassembled relation with respect to the clamping surface of a threaded fastener by means of circumferentially spaced laterally extruded peripheral elements;

Figure 9 is a transverse sectional view taken substantially along the line 9—9 of Figure 8, disclosing the manner in which the upset or extruded washer retaining elements are circumferentially spaced along the peripheral section of the fastener in the vicinity of the clamping surface thereof; and Figure 10 discloses the manner in which the peripheral protuberances of Figures 8 and 9 may be employed in retaining a flat type lock washer in operative association with a complementary flat clamping surface of a conventional screw head.

Referring now to the drawing more in detail wherein like numerals have been employed to designate similar parts throughout the various figures, it will be seen that this invention contemplates a fastener unit designated generally by the numeral 16 in Figure 1. This fastener unit comprises two preassembled parts—namely, a threaded fastener or screw 14 and a lock washer 12. The screw of Figure 1 has a threaded shank 18 and a head 20 which is formed with a conical clamping surface 22. The lock washer 12 is of a countersunk or conical type designed particularly for use with conical clamping surfaces, and includes an annular body portion 24 provided along its outer margin with integral resilient locking elements 26. These locking elements are so constructed and disposed as to provide oppositely disposed teeth 28. The inner teeth are adapted to lockingly engage the conical surface 22, and the outer teeth are designed to lockingly engage the complementary countersunk area of a work piece (not shown).

A peripheral lock washer retaining section designated generally by the numeral 30 in the vicinity of the clamping surface 22 includes an annular upset or extruded protuberance 32, which extends outwardly or radially a sufficient distance to provide retaining means for the lock washer. The size and particular shape of the lock washer retaining protuberance will obviously depend upon the particular threaded fastener and lock washer with which it is to be used.

The present invention contemplates novel methods whereby the lock washer retaining protuberance 32 may be economically and expeditiously formed. This can be best understood from Figures 1 to 5, inclusive. The lock washer of Figure 3 and the screw of Figure 2 are first brought into preliminary association with each other so as to assume the position shown in Figure 4. Then a suitable upsetting or extruding instrument or tool 34 is shifted axially so as to upset a portion of the peripheral section 30 so as to produce the protuberance 32. This tool 34 is disclosed in Figures 1 and 2 and includes an annular section 36 which is adapted to engage the peripheral section 30 of the threaded fastener and thus upset or work the material of the fastener so as to urge said material axially and laterally. This working of the material through the agency of the tool 34 results in the formation of the peripheral lock washer retaining element or protuberance 32. Obviously the invention is not limited to the particular tool disclosed herein, but contemplates other material working tools whereby the form of lock washer retaining element contemplated hereby may be produced.

When the lock washer 12 and threaded fastener or screw 14 are thus preassembled, the inner lock washer teeth 28 are positioned in operative association with respect to the conical surface 22, and the outer teeth are positioned in readiness to be embedded within a complementary surface area of the work piece. Such preassembled lock washers and fasteners provide what I prefer to call fastener units which may be shipped by the manufacturer to the place of ultimate use, thereby obviating the necessity of manually associating lock washers and screws at the place where such devices are to be applied to the work. It has been the practice in many instances to manually assemble the lock washers and screws just prior to their application to the work, and this has entailed considerable time and effort which the present invention seeks to avoid.

The invention is not limited to the preassembled or conical screw heads with complementary lock washers, but also contemplates the assembly of conventional flat type washers indicated generally by the numeral 38 (Figure 6) with the complementary flat clamping surface 40 of a conventional screw head 42. The lock washer 38 includes an annular body portion of spring stock 44 and a plurality of outer marginal elements 46 providing oppositely positioned resilient lock washer teeth 48. The screw shank 50 is upset by the application of the tool 34 so as to produce an annular lock washer retaining protuberance 32a. This protuberance 32a extends radially or outwardly a sufficient distance so as to prevent the washer body 14 from being physically separated from the screw head in the same manner as the protuberance 32 previously described serves to retain the lock washer 12 in proper preassembled relation.

In Figure 7 I have disclosed the manner in which the present invention may be employed in connection with the preassembly of nuts and lock washers. In Figure 7 I have shown a nut designated generally by the numeral 52 which is provided with a clamping surface 54. A peripheral lock washer retaining section designated by the numeral 56 is provided in the vicinity of, and extends a short distance beyond, the clamping surface 54. The lock washer 38 is first preliminarily associated with the clamping surface 54, and a suitable tool is then employed to exert sufficient force axially of the peripheral section 56 so as to work or extrude the material thereof outwardly, and thus present an annular protuberance 32b, which corresponds functionally with the protuberances 32 and 32a previously described. Obviously the peripheral section 56—similarly to the peripheral sections 30 of Figures 1 to 5, inclusive—before the extrusion of the protuberance thereon, is of a diameter which is slightly less than the internal diameter of the lock washer to be associated therewith. Thus the lock washer 38, preassembled with the nut 52, has its locking teeth positioned in operative relation with respect to the clamping surface 54 of the nut and in operative relation with respect to the clamping surface of the work piece to which the fastener unit may be applied.

Figure 8 is a view similar to Figure 5, disclosing a modified form of lock washer retaining protuberance. The lock washer retaining protuberances 32c of Figure 8 are formed by a suitable tool 58 having teeth or punch portions formed along the working end thereof designed to upset or extrude the complementary circumferentially spaced protuberances 32c upon the lock washer retaining section 30. In Figure 9 I have shown a cross sectional view which discloses the peripheral and circumferentially spaced positioning of the protuberances 32c.

In Figure 10 I have disclosed the manner in which the protuberances 32c of Figures 8 and 9 may be used in a screw formed to secure the flat type lock washer 38 in operative association with the clamping surface 40 of the screw head 42. It will be noted that the protuberances 32c in Figure 10 serve to retain the teeth of the lock washer 38 in operative relation with respect to the clamping surface 40 in the same manner as the lock washer teeth 28 are retained in operative relation with respect to the conical clamping surface 22 of Figure 8.

From the foregoing it will be apparent that the present invention contemplates a preassembled threaded fastener and lock washer and extremely simple and practical methods whereby such fastener units may be produced. By exerting sufficient axial force against the material of the lock washer retaining section positioned in the immediate vicinity of the clamping surface, an annular protuberance or circumferentially spaced protuberances are formed which efficiently serve to retain the lock washer and threaded fastener in preassembled relation. In other words, the concentric relation of the lock washer with respect to the threaded fastener is always maintained, and these combined elements may be transported or shifted from place to place without the hazard of displacing this concentric relationship. Also, the previously employed methods of manually assembling the lock washers and threaded clamping elements are completely obviated by the use of the invention disclosed and claimed herein. Obviously the invention contemplates structural features both as to the assembled parts and the tools for forming the peripheral protuberances without departing from the spirit and scope of the appended claims.

Claims covering the fastener units as articles of manufacture are contained in my co-pending applications, Serial Numbers 355,744, 355,745, and 355,746, filed September 7, 1940.

Having thus described my invention, what I claim as new and desire to secure by Letters Patent is:

1. The method of preassembling a lock washer and a rotary threaded fastener having a clamping surface and a peripheral lock washer receiving portion positioned in the vicinity of one extremity of the thread on said fastener, which consists in associating a lock washer in encircling relation with respect to said peripheral receiving portion, and upsetting said peripheral portion in the vicinity of said thread extremity by the pressure of a tool urged axially thereof so as to form a protuberance extending beyond the inner margin of the lock washer at the free side thereof.

2. The method of preassembling a lock washer and a rotary threaded fastener having a clamping surface and a peripheral lock washer receiving portion positioned in the vicinity of one extremity of the thread on said fastener, which consists in associating a lock washer in encircling relation with respect to said peripheral receiving portion, and upsetting said peripheral portion in the vicinity of said thread extremity at circumferentially spaced intervals so as to form a plurality of protuberances extending beyond the inner margin of the lock washer at the free side thereof.

3. The method of preassembling a lock washer and a rotary threaded fastener having a clamping surface and a peripheral lock washer receiving portion positioned in the vicinity of one extremity of the thread on said fastener, which consists in associating a lock washer in encircling relation with respect to said peripheral receiving portion, and annularly engaging said peripheral portion by shifting a tool axially toward the clamping surface of the fastener so as to form an upset annular protuberance extending beyond the inner margin of the lock washer at the free side thereof.

4. The method of preassembling a lock washer and a rotary threaded fastener having a clamping surface and a peripheral lock washer receiving portion positioned in the vicinity of one extremity of the thread on said fastener, which consists in associating a lock washer in encircling relation with respect to said peripheral receiving portion, and axially applying an annular tool surface in encircling relation with respect to said peripheral receiving portion so as to upset a protuberance extending beyond the inner margin of the washer at the free side thereof.

5. The method of preassembling a lock washer and headed screw provided with a peripheral lock washer receiving portion in the vicinity of the screw head which is slightly larger in diameter than the outer diameter of the screw thread, which consists in associating a lock washer in encircling relation with respect to said receiving portion, and applying pressure against the outer extremity of said receiving portion in an axial direction so as to upset a protuberance extending beyond the inner margin of the lock washer at the free side thereof.

6. The method of preassembling a lock washer and a headed screw element provided with an annular peripheral lock washer receiving portion of relatively short axial extent in the vicinity of the head, which is slightly larger in diameter than the remaining portion of the screw element, which consists in associating a lock washer in encircling relation with respect to said peripheral annular receiving portion, and applying pressure to the outer extremity of said receiving portion so as to upset a protuberance extending beyond the inner margin of the lock washer at the free side thereof.

7. The method of preassembling a lock washer and headed screw element provided with a peripheral annular lock washer receiving portion of relatively short axial extent in the vicinity of the head, which is slightly larger in diameter than the outer diameter of the remaining portion of the screw, which consists in associating a lock washer in encircling relation with respect to said peripheral annular receiving portion, and applying pressure to the outer extremity of said receiving portion so as to upset a plurality of protuberances extending beyond the inner margin of the lock washer at the free side thereof.

CARL G. OLSON.

DISCLAIMER 2,227,464.—*Carl G. Olson*, Chicago, Ill. FASTENER UNIT AND METHOD OF PRODUCING IT. Patent dated January 7, 1941. Disclaimer filed November 26, 1941, by the assignee, *Illinois Tool Works*.

Hereby enters this disclaimer to claims 1, 2, 5, 6, and 7 in said specification.

[*Official Gazette December 16, 1941.*]